J. KLEE.

Assignor to R. C. ANTHONY.

Bottle-Stopper.

No. 8,034. Reissued Jan. 8, 1878.

Witnesses:
Wm. H. Hyers.
A. J. Keenan

Inventor.
John Klee

N. PETERS, PHOTO-LITHOGRAPHER, WASHINGTON, D. C.

UNITED STATES PATENT OFFICE.

JOHN KLEE, OF DAYTON, OHIO, ASSIGNOR TO ROWLAND C. ANTHONY, OF NEW YORK CITY.

IMPROVEMENT IN BOTTLE-STOPPERS.

Specification forming part of Letters Patent No. 82,230, dated September 15, 1868; Reissue No. 8,034, dated January 8, 1878; application filed December 11, 1877.

*To all whom it may concern:*

Be it known that I, JOHN KLEE, of the city of Dayton, county of Montgomery, and State of Ohio, have invented a new and Improved Bottle-Stopper; and I do hereby declare that the following is a full and exact description thereof, reference being had to the accompanying drawings, and to the letters of reference marked thereon, making a part of the specification.

Figure 1:
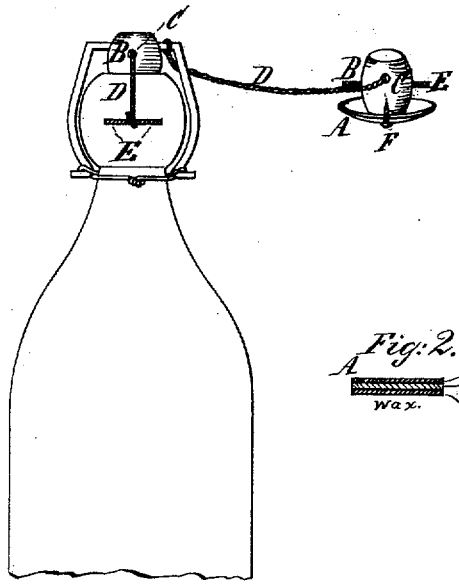
Figure 2:
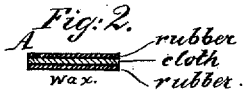

In the drawing, Figure 1 represents the stopper in the bottle, as well as withdrawn therefrom; and Fig. 2, a section of the rubber-packing disk.

The nature of my invention consists in constructing a bottle stopper or plug, B, out of wood or any other suitable material, tapering at both ends. To the end that enters the neck of the bottle I attach a rubber washer or packing, A, by a tack, F. This washer or packing, when pressed into the neck of the bottle, around the end of the stopper or plug B, forms an air-tight joint.

The hole C through the top end of the stopper or plug B is for the purpose of passing the string or wire D through. Said string or wire has a T or cross bar, E, on the one end, the other end being tied or fastened to the neck of the bottle or cork-fastener, as shown in the drawing. The object of this is to prevent the stopper or plug B from being lost when the bottle is empty.

To enable others skilled in the art to make and use my invention, I will proceed to describe its construction and operation.

I use any kind of a bottle; and in order to make a good joint, perfectly air-tight, I make my stopper or plug B of wood or any other suitable material, tapering at both ends. To the end intended to enter the neck of the bottle I attach a rubber disk or packing, A, with a tack, F. About half-way between the bulge of the stopper or plug B and the upper end of the same I make a hole, C, through which to pass the string or wire D. To one end of this string or wire D, I fasten a piece of wire at its midlength, as shown at E. The other end of the string or wire D is tied or fastened to the neck of the bottle, or to the cork-fastener, as shown in the drawing.

When the bottle is filled and the stopper pressed home, the end of the string or wire, with the wire on it, is passed through the hole. The object is that when the cork-fastener is removed and the stopper drawn from the bottle it will not fly off and be lost.

The rubber washer or packing A is a disk, secured to the end of the stopper B by a single tack, F, the head of the latter being tinned or silvered to prevent corrosion.

I make the disk A of what is known as "rubber packing," the same consisting of two thicknesses of rubber and an intermediate layer of cloth, or a suitable fibrous material, to prevent stretching or tearing. (See Fig. 2.)

The face of the disk A, which comes in contact with the liquid contents of the bottle, is provided with a coating of bees-wax or other suitable material, in order to prevent the taste of the liquid from being deteriorated by contact with the rubber.

The upper end of the stopper, being conical, adapts the cork or stopper fastener to secure it by merely straddling its upper end, and, as the stopper is subjected to increased depression as it wears from use, the straddling arms of the cork-fastener are brought nearer together from time to time, to make them conform to the depressed position of the stopper.

Having thus described my invention, what I claim as new, and desire to secure by Letters Patent, is—

1. A bottle-stopper having a shank perforated transversely near its upper end, and having an elastic disk secured to the shank below the end that enters the neck of a bottle, the disk having a free annular rim extending beyond the perimeter of the lower end of the shank, and capable of upward flexure when pressed downward into the neck of a bottle, substantially as described.

2. The combination, with a bottle-stopper plug, of an elastic disk secured to the plug below the end that enters the neck of the bottle, and having a free annular rim extending beyond the perimeter of said end, so that the disk peripherally surrounds the end of the plug when pressed downward into the neck of the bottle, and forms an air-tight joint, substantially as described.

3. The stopper or plug B, made conical or tapering at both ends, and provided at one end with the rubber-packing disk A, arranged as described, and secured by a tack, F, all as and for the purpose herein set forth.

JOHN KLEE.

Witnesses:
WM. H. HYERS,
A. J. KEENAN.